US010616559B1

(12) United States Patent
Verma et al.

(10) Patent No.: US 10,616,559 B1
(45) Date of Patent: Apr. 7, 2020

(54) VIRTUAL STEREO DEVICE REDIRECTION FOR VIRTUAL DESKTOPS

(71) Applicant: VMWARE, INC., Palo Alto, CA (US)

(72) Inventors: Shubham Verma, Bangalore (IN); Prabhakara Rao Narnakaje Venugopala, Bangalore (IN); Samdeep Nayak, Bangalore (IN); Suket Gakhar, Palo Alto, CA (US)

(73) Assignee: VMWARE, Inc., Palo Alto, CA (US)

(*) Notice: Subject to any disclaimer, the term of this patent is extended or adjusted under 35 U.S.C. 154(b) by 0 days.

(21) Appl. No.: 16/267,397

(22) Filed: Feb. 5, 2019

(30) Foreign Application Priority Data

Dec. 12, 2018 (IN) .............................. 201841047045

(51) Int. Cl.
*H04N 13/246* (2018.01)
*G06F 9/455* (2018.01)
*H04N 13/194* (2018.01)

(52) U.S. Cl.
CPC ....... *H04N 13/246* (2018.05); *G06F 9/45558* (2013.01); *H04N 13/194* (2018.05); *G06F 2009/45591* (2013.01); *G06F 2009/45595* (2013.01)

(58) Field of Classification Search
CPC ................ H04N 13/246; H04N 13/194; G06F 9/45558; G06F 2009/45591; G06F 2009/45595
See application file for complete search history.

(56) References Cited

U.S. PATENT DOCUMENTS

2018/0338084 A1\* 11/2018 Edpalm ................ H04N 5/2258

\* cited by examiner

*Primary Examiner* — Nam D Pham
(74) *Attorney, Agent, or Firm* — Patterson & Sheridan, LLP

(57) ABSTRACT

Embodiments of the present disclosure relate to synthesizing a virtual stereo device. Embodiments include receiving a request from a user to synthesize the virtual stereo device based on a first camera and a second camera associated with a client device. Embodiments include calibrating the virtual stereo device by using images received from the first camera and the second camera to determine calibration parameters. Embodiments include storing the calibration parameters in a manifest file and transmitting the manifest file to the client device. Embodiments include receiving encoded frames associated with the virtual stereo device from the client device, each of the encoded frames including a stereo image that has been created by the client device, based on the calibration parameters in the manifest file, from image data captured using the first camera and the second camera. Embodiments include decoding the encoded frames for use by an application involving stereo vision.

20 Claims, 5 Drawing Sheets

VIRTUAL STEREO DEVICE REDIRECTION FOR VIRTUAL DESKTOPS

BACKGROUND

As computing technology becomes increasingly integrated with daily life, there has been an increase in the use of image data from a user's environment by computing applications. For example, cameras may be used to capture images for use in a variety of purposes, such as video conferencing, live presentations, augmented reality, virtual reality, remote assistance, education, and research. In some cases, two cameras are used together to capture left and right images for the purpose of providing "stereo vision". Stereo vision is particularly useful for determining depth, such as for the purpose of sensing user input (e.g., through gestures), creating depth images, planar projections of three-dimensional point clouds (e.g., for overlaying three-dimensional graphics onto images of a user's environment), color-and-depth images, and the like.

Special stereo or depth cameras are available, but these devices are often costly, and are not frequently integrated with user devices, such as mobile phones. It is becoming more common, however, for user devices to include dual cameras. Smartphones, for example, are increasingly being equipped with dual cameras that face in the same direction. Because these dual cameras are not inherently configured to work together for stereo vision, the image data from each camera must be processed separately. For many applications, such as videoconferencing or augmented reality applications, image data is transmitted over a network for processing, such as by a remote server, in order to provide various functionality. Transmitting image data requires a significant amount of bandwidth, and can often result in dropped frames and/or timing issues. In particular transmitting image data from two separate cameras to a destination (e.g., a virtual desktop hosted in a datacenter) on a network may result in loss of data and synchronization issues, as images from the two cameras are unlikely to reach the destination simultaneously.

DETAILED DESCRIPTION

Figure 1:
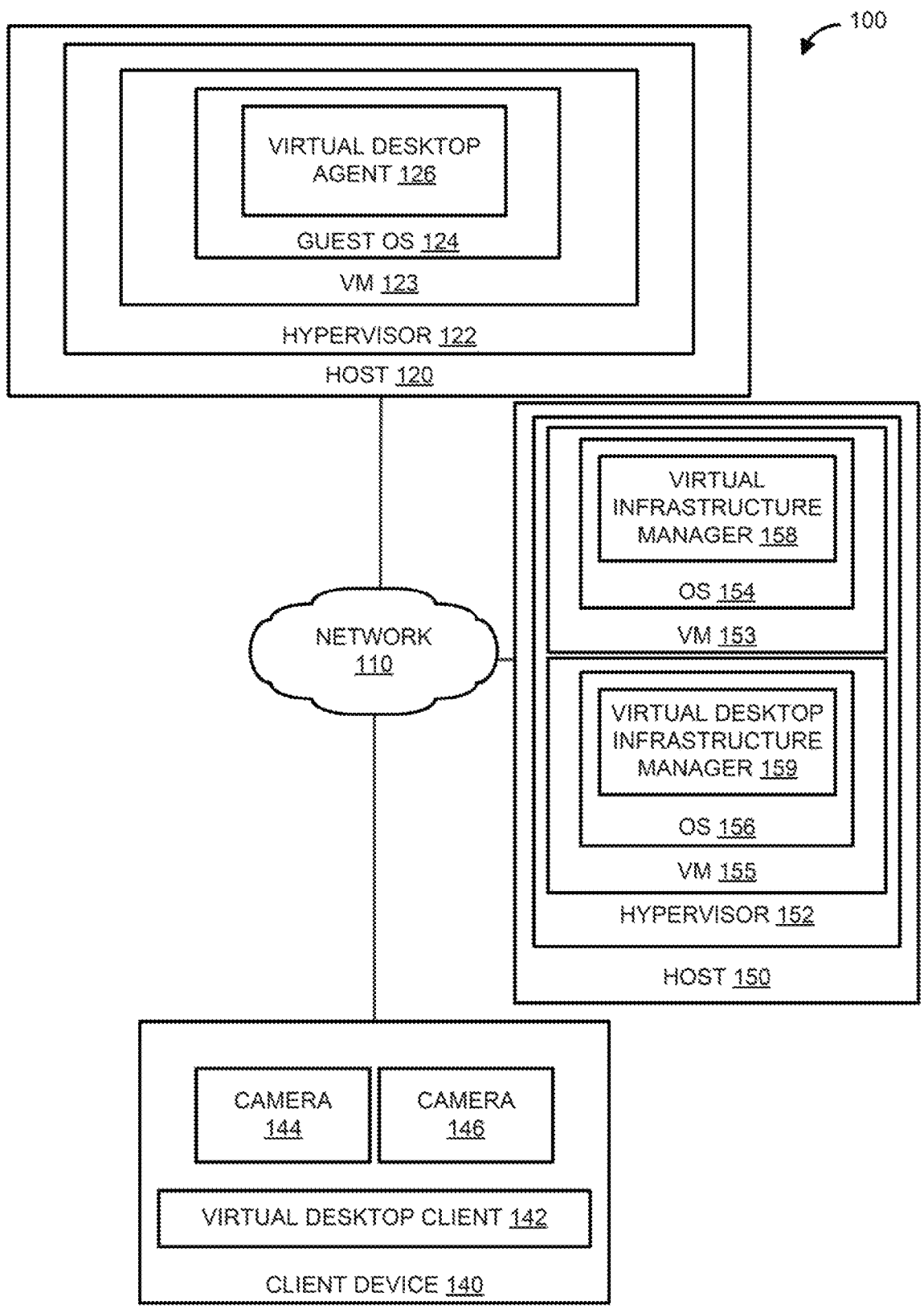
FIG. 1 illustrates components of an example computing environment in which an embodiment may be implemented.

Embodiments presented herein relate to techniques for synthesizing a virtual stereo device. In certain embodiments, two image capture devices (e.g., monocular cameras) associated with a client device, such as a mobile phone, are used to synthesize a virtual stereo device for redirecting stereo images to a remote device, such as for use by an application involving stereo vision. For example, a left camera and a right camera may be integrated with or attached to the client device. According to embodiments, resources (e.g., processing and storage resources) of the client device are utilized to generate stereo images based on images captured by the two monocular cameras associated with the client device so that separate images from the two monocular cameras do not have to be individually redirected to the remote device for processing. The stereo images may be generated at the client device based on parameters received from the remote device in a manifest file that defines aspects of the virtual stereo device, and may be depth maps, disparity maps, two-dimensional point cloud projections, and/or the like. Once generated, the stereo images may be encoded and transmitted to the remote device as images associated with the virtual stereo device. The stereo images may then be decoded by the remote device and used for various purposes involving stereo vision, such as video conferencing, live presentations, augmented reality, virtual reality, remote assistance, education, and research.

Techniques described herein are, in some instances, implemented in the context of a virtual desktop system. For example, in some embodiments, the client device comprises a virtual desktop client and the remote device comprises a virtual desktop agent. The virtual desktop agent generally performs processing associated with providing a virtual desktop to a user who accesses the virtual desktop via the virtual desktop client. Certain applications associated with the virtual desktop may involve stereo vision, such as applications that receive user input via gestures or overlay content onto images of the user's environment based on depth maps, disparity maps, two-dimensional point cloud projections, and/or the like. A user may initiate and configure, at the virtual desktop agent, a virtual stereo device that is synthesized based on two monocular cameras associated with the client device. In some embodiments, the remote desktop agent manages setup and calibration of the virtual stereo device, such as by requesting, from the client device, a series of images captured using the two monocular cameras and determining calibration parameters based on the series of images. The calibration parameters for the virtual stereo device may be provided in the form of a manifest file to the remote desktop client, which may present the virtual stereo device to the virtual desktop agent as if it were a physical stereo camera. Resources of the client device are then used to generate stereo images, based on the calibration parameters in the manifest file, from images captured using the two monocular cameras. The stereo images are encoded into frames and redirected by the virtual desktop client to the virtual desktop agent, where the frames are decoded. In some examples, the decoded frames are used within the virtual desktop to detect user input and/or overlay content onto images from the client device.

Techniques described herein constitute an improvement with respect to conventional practices, as they allow for the efficient generation and redirection of stereo image data over a network from a client device to a remote device without the use of expensive stereo imaging equipment and without excessively burdening processing, storage, and/or communication resources associated with the remote device and/or the network. The use of two monocular cameras, which are generally inexpensive and/or already integrated with client devices, to create stereo images makes stereo vision technology affordable and readily accessible to users. In fact, there has recently been a rapid adoption of mobile phones that already include left and right monocular cameras and powerful graphics processing units (GPUs). Synthesizing a virtual stereo device based on two monocular cameras associated with a client device according to techniques described herein allows for the efficient use of readily available technology for the redirection of stereo image data to a remote device. Generating encoded stereo images at the client device for transmission to the remote device avoids a variety of problems associated with separately transmitting images from both cameras for processing at the remote device, such as large amounts of bandwidth usage, congestion, synchronization issues due to images from the two cameras reaching the remote device at different times, data loss, and other problems. Furthermore, generating and encoding stereo images at the client device frees up resources of the remote device for other tasks, such as processing related to virtual desktops and associated applications. As such, embodiments described herein allow for stereo vision to be provided effectively in a network environment without undue cost, resource usage, or other issues.

FIG. 1 illustrates components of a computing environment 100 in which embodiments of the present disclosure may be implemented. As shown, system 100 includes host 120, client device 140, and host 150, connected by network 110 (e.g., the internet). Hosts 120, and 150 may comprise physical computing devices (e.g., servers) which are connected to network 110. While two hosts, 120 and 150 are depicted, there may be any number of hosts in computing environment 100. Client device 140 may comprise a computing device such as a mobile phone, desktop or laptop computer, tablet computer, or a virtual realty or augmented reality device (e.g., VR goggles, wearable AR display, etc.).

Host 120 comprises a hypervisor 122, which comprises a virtual machine (VM) 123 that runs a guest Operating System (OS) 124. Hypervisor 122 abstracts hardware resources of host 120 and serves as an interface between VMs running on host 120, such as VM 123, and the hardware resources of host 120. Hypervisor 122 also serves as an interface with VMs running on other host machines, such as host 150 over network 110. In this example, hypervisor 122 is an interface for VM 123, but in other embodiments host 120 may host a plurality of other VMs, which may all be connected to, and controlled by, hypervisor 122. In such examples, hypervisor 122 can direct network communications between the plurality of VMs and other entities. Guest OS 124 runs virtual desktop agent 126, which is accessed by client device 140 via virtual desktop client 142. For example, virtual desktop client 142 may comprise an interface (e.g., a browser or other local software interface, such as a virtual desktop software application) through which a user of client device 140 accesses a virtual desktop that is provided by virtual desktop agent 126. In one embodiment, virtual desktop agent 126 comprises a virtualization program through which the user provisions, manages, and accesses virtual desktops.

A virtual desktop generally refers to a desktop or other application of a VM that is accessed from a virtual desktop client. With virtual desktop functionality, users can access desktops or applications running in a remote data center (e.g., host 120) through network 110, from any location, using a general purpose computer running a commodity operating system and a virtual desktop client software program, such as virtual desktop client 142 on client device 140.

Virtual desktop agent 126 performs operations related to synthesizing a virtual stereo device according to embodiments of the present disclosure. In some embodiments, virtual desktop client 142 provides information related to cameras 144 and 146 (which may be monocular cameras associated with client device 140) to virtual desktop agent 126. For example, cameras 144 and 146 may be left and right cameras that are integrated with client device 140 or otherwise attached to client device 140, such as via a universal serial bus (USB) connection. A user of client device 140 opens virtual desktop client 142 and initiates redirection of both cameras 144 and 146 to virtual desktop agent 126, such as through USB redirection that redirects cameras 144 and 146 as separate virtual devices to virtual desktop agent 126. Accordingly, information relating to cameras 144 and 146, such as descriptors, identifiers, network addresses, and/or other connection-related information, is provided to virtual desktop agent 126.

The user then logs into a virtual desktop on virtual desktop agent 126 and chooses cameras 144 and 146 as input sources for synthesizing a virtual stereo device based on the information about cameras 144 and 146 provided by virtual desktop client 142. In some embodiments, the user provides input to virtual desktop client 142 and virtual desktop agent 126 through user interfaces associated with client device 140 and/or host 120. In some embodiments, virtual desktop agent 126 validates that cameras 144 and 146 are compatible for use in synthesizing the virtual stereo device, such as based on hardware capabilities (e.g., frame rate, resolution, and the like) of the cameras. Virtual device agent 126 then (in some instances, upon successfully validating cameras 144 and 146) begins calibration of the virtual stereo device.

In some cases, before the virtual stereo device is calibrated, cameras 144 and 146 are disconnected from virtual desktop agent 126. For example, if cameras 144 and 146 had previously been redirected to virtual desktop agent 126 (e.g., as separate virtual devices through USB redirection), then disconnect requests are exchanged between virtual desktop client 142 and virtual desktop agent 126 regarding cameras 144 and 146. In order to calibrate the virtual stereo device, virtual desktop agent 126 sends a request to virtual desktop client 142 to capture a series of images from cameras 144 and 146. For example, the series of images can include sequential two-dimensional frame pairs from cameras 144 and 146. In certain embodiments, a frame pair includes a left frame and a right frame captured, respectively, from cameras 144 and 146. Each frame pair is captured with a different orientation, position, and/or distance of the cameras with respect to one or more objects. In certain embodiments, the images are timestamped. Virtual desktop client 142 transmits the series of images to virtual desktop agent 126, which uses the images to calibrate the virtual stereo device. In alternative embodiments, virtual desktop client 142 performs calibration.

Calibrating the virtual stereo device involves determining calibration parameters based on the series of images from cameras 144 and 146. For example, virtual desktop agent 126 may use any of a variety of calibration techniques (e.g., checkerboard, symmetrical circle pattern, and/or the like) to determine the calibration parameters based on the series of images. Checkerboard calibration generally involves using the planar grid structure of a checkerboard to infer three-dimensional structure of a scene based on two-dimensional images of the checkerboard in the scene. Symmetrical circle pattern calibration generally involves a known pattern of circles to infer three-dimensional structure of a scene based on two-dimensional images of the pattern in the scene. The calibration parameters determined based on the series of images may include, for example, camera characteristics such as focal length, aperture width, and height, as well as other types of parameters, such as coefficient matrices for distortions (e.g., radial distortions, tangential distortions, and the like), rectification matrices, and/or the like. For example, coefficient matrices for rotation and translation may be determined in order to map points in the images to two-dimensional pixels while accounting for radial distortion and tangential distortion, such as if a camera lens is not perfectly parallel to the imaging plane. The coefficient matrices may be determined, for instance, based on intrinsic camera parameters, and may include x, y, and z values for rotating and/or translating points. Rectification matrices are generally rotation matrices for each of the two cameras that align each camera's coordinate system to an ideal stereo image plane so that epipolar lines in stereo images from the two cameras are parallel, and are generally determined based on camera parameters.

The calibration parameters are persisted by virtual desktop agent 126 in a manifest file for the virtual stereo device. In some embodiments, connection-related information for cameras 144 and 146, such as descriptors, is also included in the manifest file for the virtual stereo device. Virtual desktop agent 126 transmits the manifest file for the virtual stereo device to virtual desktop client 142.

Virtual desktop client 142 may, in some instances, validate the manifest file by comparing information in the manifest file to locally maintained information about cameras 144 and 146 (e.g., camera descriptors, characteristics, and the like). Virtual desktop client 142 then (in some instances, upon successful validation of the manifest file) presents the virtual stereo device, synthesized from cameras 144 and 146 according to the manifest file, to virtual desktop agent 142 as a single virtual stereo camera (e.g., similarly to how each of cameras 144 and 146 were previously redirected to virtual desktop agent 126 as separate virtual cameras). The virtual stereo device is "synthesized" from cameras 144 and 146 according to the manifest file by retrieving the information about cameras 144 and 146 from the manifest file and creating a new virtual device that is a combination of cameras 144 and 146.

The user may access virtual desktop agent 126 in order to specify an image type to be received from the virtual stereo device. For example, the user may specify that the image type is a depth map, a disparity map, a two-dimensional projection of a point cloud, or another type of stereo image. In certain embodiments, the user may specify that the image type is not a stereo image, such as monocular images only from the left camera (e.g., camera 144) or monocular images only from the right camera (e.g., camera 146), if the user does not wish to receive stereo images from the virtual stereo device. Virtual desktop agent 126 then transmits the selected image type to virtual desktop client 142.

Virtual desktop client 142 redirects images to virtual desktop agent 126 as images provided by the virtual stereo device based on the image type and the manifest file. If the image type is a monocular image from the left or right camera, then virtual desktop client 142 encodes the images from the left or right camera and sends them as encoded frames to virtual desktop client 142. If the image type is a stereo image, such as a depth map or disparity map, then virtual desktop client 142 creates images of the image type from sets of images captured by cameras 144 and 146 (e.g., pairs of left and right images) based on the calibration parameters in the manifest file. For example, the depth map (also called depth image) may be generated by calculating the depth at each pixel in a depth image from a left and right image based on the calibration parameters, such as focal length and distance between the cameras, a specified stereo matching method (like block matching, feature matching, semi-global (block) matching, etc.) and parameters for image filtering. If the image type is a two-dimensional point cloud projection, then the origin of the point cloud (calculated from the depth image and the left or right camera image) is rotated and/or translated (e.g., based on rotation and/or translation matrices that were determined or received from a user and stored in the manifest file), and the final two-dimensional projection of the point-cloud (as viewed from the new origin) is encoded and sent to virtual desktop agent 126. In some examples, a GPU of client device 140 is used to generate stereo images for the virtual stereo device. Once the images (e.g., the stereo images) are generated, they are encoded into encoded frames (e.g., using an image encoding technique), and are transmitted to virtual desktop agent 126.

Virtual desktop agent 126 decodes the encoded frames. For example, virtual desktop agent 126 and virtual desktop client 142 may share an encoding/decoding technique, and desktop agent 126 may decode the encoded frames using the technique with which the frames were encoded by virtual desktop client 142. Once decoded, the frames may be used for a variety of purposes, such as within a virtual desktop associated with virtual desktop agent 126. For example, a user may participate, through the virtual desktop in a video conference application in which the three-dimensional scene of the user's environment can now be shown. The user may make use of the virtual stereo device to redirect stereo images of the user's environment from virtual desktop client 142 to virtual desktop agent 126, and virtual desktop agent 126 may use the stereo images to overlay graphical content onto the user's environment such that the graphical content appears to be part of the user's environment. In other embodiments, virtual desktop agent 126 may use stereo images of the user's environment to detect user input, such as through gestures. For example, the user may interact with an application running on a remote desktop through gestures in front of cameras 144 and 146.

Host 150 comprises a hypervisor 152, which supports two VMs 153 and 155 that run operating systems 154 and 156. Operating system 154 comprises a virtual infrastructure manager 158, which may perform operations related to a variety of actions on virtual machines like 123, such as suspending, starting, stopping, taking a snapshot, taking a screenshot, triggering migration, creating templates, and sharing a virtual machine. Operating system 156 comprises a virtual desktop infrastructure manager 159, which may perform operations related to collecting configuration information of virtual desktops on host 120, like user entitlements and desktop protocol preferences (BLAST, PCoIP, etc.). These configurations are used by virtual desktop agent 126 to control the access of content (e.g., a screen of a virtual desktop or application running on the virtual desktop) to different users. Virtual desktop infrastructure manager 159 may allow a user to apply polices for a virtual stereo device (e.g. allowing or denying access for the virtual stereo device, default or specific settings like output image type for the virtual stereo device, watermarks, etc.) on one or more virtual desktops. Virtual infrastructure manager 158 and virtual desktop infrastructure manager 159 interact with components on remote hosts, such as host 120, over network 110, such as using one or more virtual network interface cards provided by hypervisor 152. Hypervisor 152 serves as an interface that allows for communication between VMs 153 and 155 and remote components, such as VM 123.

Figure 2:
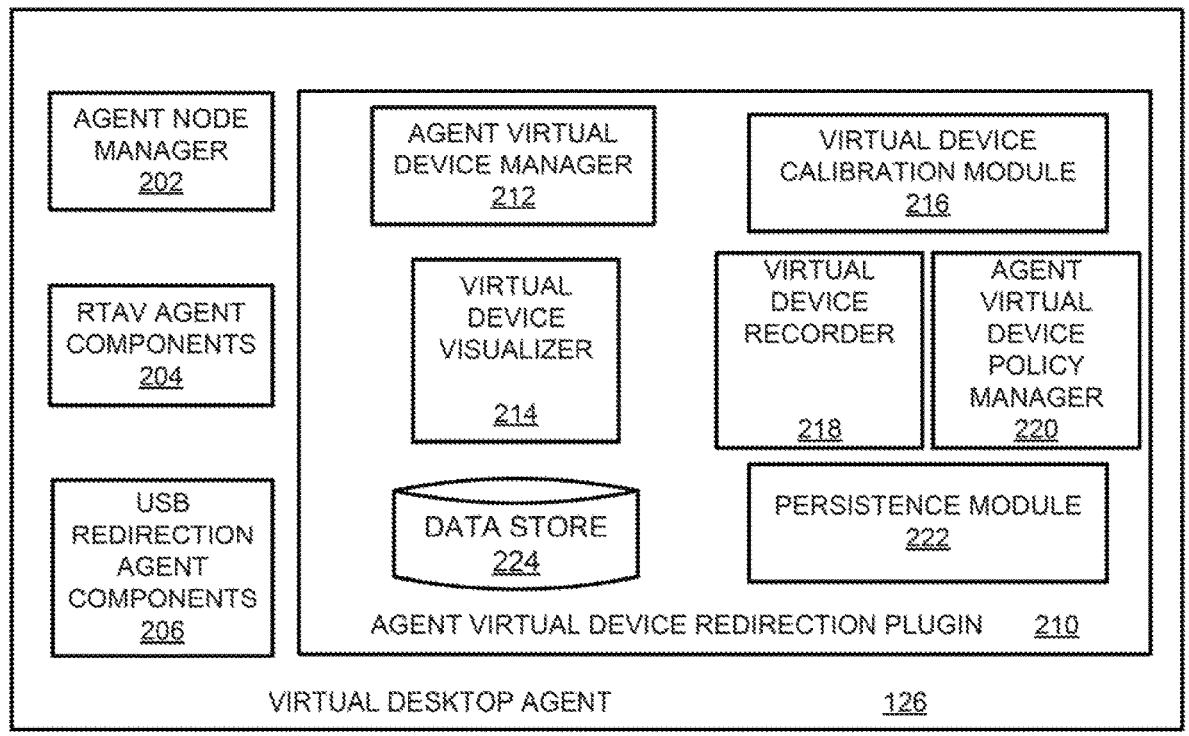
FIG. 2 illustrates example components of a virtual desktop agent for synthesizing a virtual stereo device, according to embodiments of the present disclosure.

FIG. 2 illustrates components of a virtual desktop agent 126, such as virtual desktop agent 126 of FIG. 1. The components depicted in FIG. 2 are merely exemplary, and the functionality described as being performed by certain components may be performed by any number of local or remote components.

As shown, virtual desktop agent 126 comprises agent node manager 202, which performs various operations related to provisioning and managing operations on virtual desktops. Virtual desktop agent 126 further comprises real-time audio video (RTAV) agent components 204, which perform operations related to RTAV redirection. In RTAV, devices (e.g., cameras) are left local to the client, and images are pulled from the local devices. The images are then encoded, delivered to the guest virtual machine (e.g., on virtual desktop agent 126), and decoded. A virtual webcam is installed in the guest virtual machine, which then "plays" the received video, and 3rd-party apps (e.g., video conferencing applications, remote assistance applications, and the like) can use these virtual devices. Encoding the images results in efficient bandwidth usage, allowing RTAV technology to scale across many different types of systems. RTAV agent components 204 may, for example, comprise agent-side components that correspond to client-side RTAV components that redirect images (e.g., monocular or stereo images) from client device 140 of FIG. 1 to virtual desktop agent 126, and may allow for opening and closing a virtual device (e.g., the virtual stereo device), starting and stopping a stream (e.g., of images), and the like.

Virtual desktop agent 126 further comprises USB redirection agent components 206, which perform operations related to USB redirection between a client device, such as virtual desktop client 142 of FIG. 1 and virtual desktop agent 126. USB redirection is a technology that allows an end user to plug an external device into a USB port on their endpoint and access the device from within a virtual desktop or application. The redirection process involves forwarding the USB device's functionality from a local device to a virtual desktop over the network. For example, USB redirection agent components 206 may comprise agent-side components that correspond to client-side USB redirection components that redirect monocular image data from camera 144 or 146 on client device 140 of FIG. 1 to virtual desktop agent 126. While USB redirection may be useful for forwarding monocular images from individual cameras under certain circumstances, it often requires a significant amount of bandwidth. For example, USB redirection generally requires more bandwidth than RTAV techniques for transferring image data. As such, USB redirection is not generally well-suited to redirection of images from more than one camera to a virtual desktop.

Virtual desktop agent 126 further comprises agent virtual device redirection plugin 210, which performs operations related to synthesizing a virtual stereo device. In some embodiments, agent virtual device redirection plugin 210 comprises an add-on or expansion to an existing application. For example, agent virtual device redirection plugin 210 may add functionality related to synthesizing a virtual stereo device to an existing virtual desktop agent 126.

Agent virtual device redirection plugin 210 comprises an agent virtual device manager 212, which performs operations related to synthesizing a virtual stereo device as described herein. For example, agent virtual device manager 212 may interact with USB redirection agent components 206 to acquire descriptors of two cameras to be used for synthesizing a virtual stereo device by request of a user (e.g., based on user input via a user interface associated with virtual desktop agent 126) and initiate calibration of the virtual stereo device. Virtual device calibration module 216 calibrates (e.g., upon request of agent virtual device manager 212) the virtual stereo device by requesting a series of images from the client device (e.g., through interactions with virtual desktop client 142) and using the series of images to determine calibration parameters. Virtual device calibration module 216 stores the calibration parameters in a manifest file for the virtual stereo device and transmits the manifest file to the client device.

Agent virtual device redirection plugin 210 further comprises virtual device visualizer 206, which is used to visualize real-time instantaneous images being received from the virtual stereo device, and may, for example, be used for debugging purposes by application developers. For example, visualizer 206 may output a real-time visualization of the images as they are received, and the visualization may be displayed on a display device associated with guest OS 124 or one or more other local or remote display devices. An application developer may watch the visualization for debugging purposes, such as to ensure that the images are being correctly generated and encoded by the client device, correctly transmitted, and correctly decoded.

Agent virtual device redirection plugin 210 further comprises virtual device recorder 218, which interacts with the client device to acquire images. For example, virtual device recorder 218 may interact with one or more components of the client device to acquire a series of images from the cameras on behalf of virtual device calibration module 216 for calibrating the virtual stereo device. Virtual device recorder 218 also interacts with the client device to acquire frames generated by the client device for the virtual stereo device and persist the frames along with additional metadata like the virtual stereo device calibration and configuration parameters present in the manifest file.

Agent virtual device redirection plugin 210 further comprises agent virtual device policy manager 220, which performs operations related to configuring, maintaining, and enforcing polices with respect to the virtual stereo device. For example, agent virtual device policy manager 220 may receive input from a user identifying an image type to be provided by the virtual stereo device, and may provide this image type to the client device for use with respect to the virtual stereo device.

Agent virtual device redirection plugin 210 further comprises persistence module 222, which manages storage and retrieval of data in data store 224. For example, persistence module 222 may receive and store image data, descriptors, calibration parameters, manifest files, policies, image types, and other types of data related to the virtual stereo device in data store 224, and may retrieve the data from data store 224 as needed by other components.

The components of virtual desktop agent 126 collectively perform processing related to synthesizing virtual stereo devices as described herein. In other embodiments, certain tasks associated with virtual stereo devices may be performed by alternative combinations of local or remote components.

Figure 3:
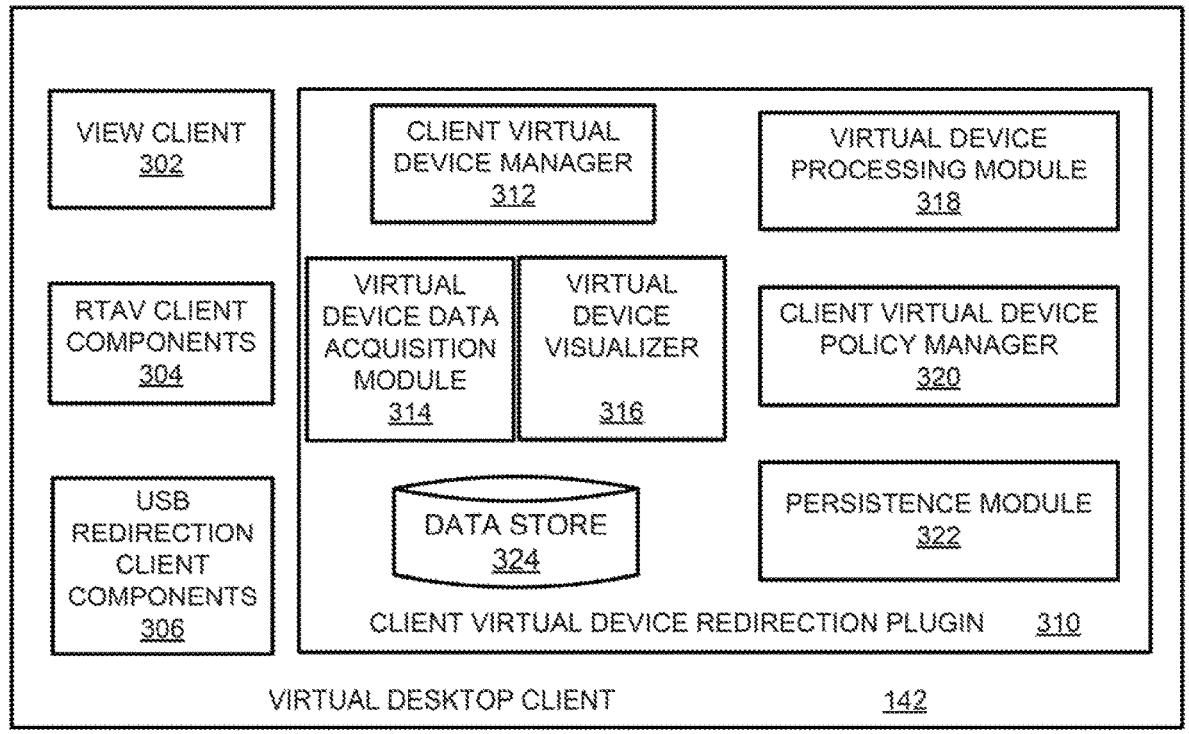
FIG. 3 illustrates example components of a virtual desktop client for synthesizing a virtual stereo device, according to embodiments of the present disclosure.

FIG. 3 illustrates components of a virtual desktop client 142, such as virtual desktop client 142 of FIG. 1. The components depicted in FIG. 3 are merely exemplary, and the functionality described as being performed by certain components may be performed by any number of local or remote components.

As shown, virtual desktop client 142 comprises view client 302, which performs operations related to accessing and interacting with virtual desktops, such as virtual desktops provided by virtual desktop agent 126 of FIGS. 1 and 2. Virtual desktop client 142 further comprises real-time audio video (RTAV) client components 304, which perform operations related to RTAV redirection. RTAV client components 304 may, for example, comprise client-side components that correspond to agent-side RTAV components (e.g., RTAV agent components 204 of FIG. 2) that receive redirected images (e.g., monocular or stereo images) from RTAV client components 304.

Virtual desktop client 142 further comprises USB redirection client components 306, which performs operations related to USB redirection between the client device and an agent component, such as virtual desktop agent 126 of FIGS. 1 and 2. For example, USB redirection client components 306 may comprise client-side components that correspond to agent-side USB redirection components (e.g., USB redirection agent components 206 of FIG. 2) that receive redirected monocular image data from cameras on the client device to virtual desktop agent 126.

Virtual desktop client 142 further comprises client virtual device redirection plugin 310, which performs operations related to synthesizing a virtual stereo device. In some embodiments, client virtual device redirection plugin 310 comprises an add-on or expansion to an existing application. For example, client virtual device redirection plugin 310 may add functionality related to synthesizing a virtual stereo device to an existing virtual desktop client 142.

Client virtual device redirection plugin 310 comprises client virtual device manager 312, which performs operations related to synthesizing a virtual stereo device as described herein. For example, client virtual device manager 312 may manage synthesizing the virtual stereo device through interaction with other components. Client virtual device redirection plugin 310 further comprises virtual device data acquisition module 314, which acquires images for virtual devices, such as the virtual stereo device. For example, virtual device data acquisition module 314 may acquire images from cameras associated with the client device. During calibration, virtual device data acquisition module 314 may acquire a series of images from the cameras to provide to virtual desktop agent 126. After the virtual stereo device has been calibrated and the manifest file has been received, virtual device data acquisition module 314 may acquire images from the cameras for use in generating stereo images based on the manifest file.

Client virtual device redirection plugin 310 further comprises virtual device visualizer 306, which is used to visualize real-time instantaneous images for the virtual stereo device, and may, for example, be used for debugging purposes by application developers. For example, visualizer 306 may output a real-time visualization of the stereo images as they are generated for the virtual stereo device, and the visualization may be displayed on a display device associated with client device 140 or one or more other local or remote display devices. An application developer may watch the visualization for debugging purposes, such as to ensure that the images are being correctly generated.

Client virtual device redirection plugin 310 further comprises virtual device processing module 318, which performs operations related to generating images for the virtual stereo device. For example, virtual device processing module 318 may use calibration parameters, filtering parameters, and a specified stereo matching method (like block matching, feature matching, semi-global (block) matching, etc.) in the manifest file for the virtual stereo device to generate stereo images based on images from the two cameras. In some embodiments, virtual device processing module 318 uses a GPU associated with the client device to perform processing related to generating stereo images.

Client virtual device redirection plugin 310 further comprises client virtual device policy manager 320, which performs operations related to configuring, maintaining, and enforcing polices with respect to the virtual stereo device. For example, client virtual device policy manager 220 may receive policy information regarding an image type selected by a user from agent virtual device policy manager 220, and may provide the image type to other components, such as client virtual device manager 312 and virtual device processing module 318 for use in generating images for the virtual stereo device.

Client virtual device redirection plugin 310 further comprises persistence module 322, which manages storage and retrieval of data in data store 324. For example, persistence module 322 may receive and store image data, descriptors, calibration parameters, manifest files, policies, image types, and other types of data related to the virtual stereo device in data store 324, and may retrieve the data from data store 324 as needed by other components.

The components of virtual desktop client 142 collectively perform processing related to synthesizing virtual stereo devices as described herein. In other embodiments, certain tasks associated with virtual stereo devices may be performed by alternative combinations of local or remote components.

Figure 4:
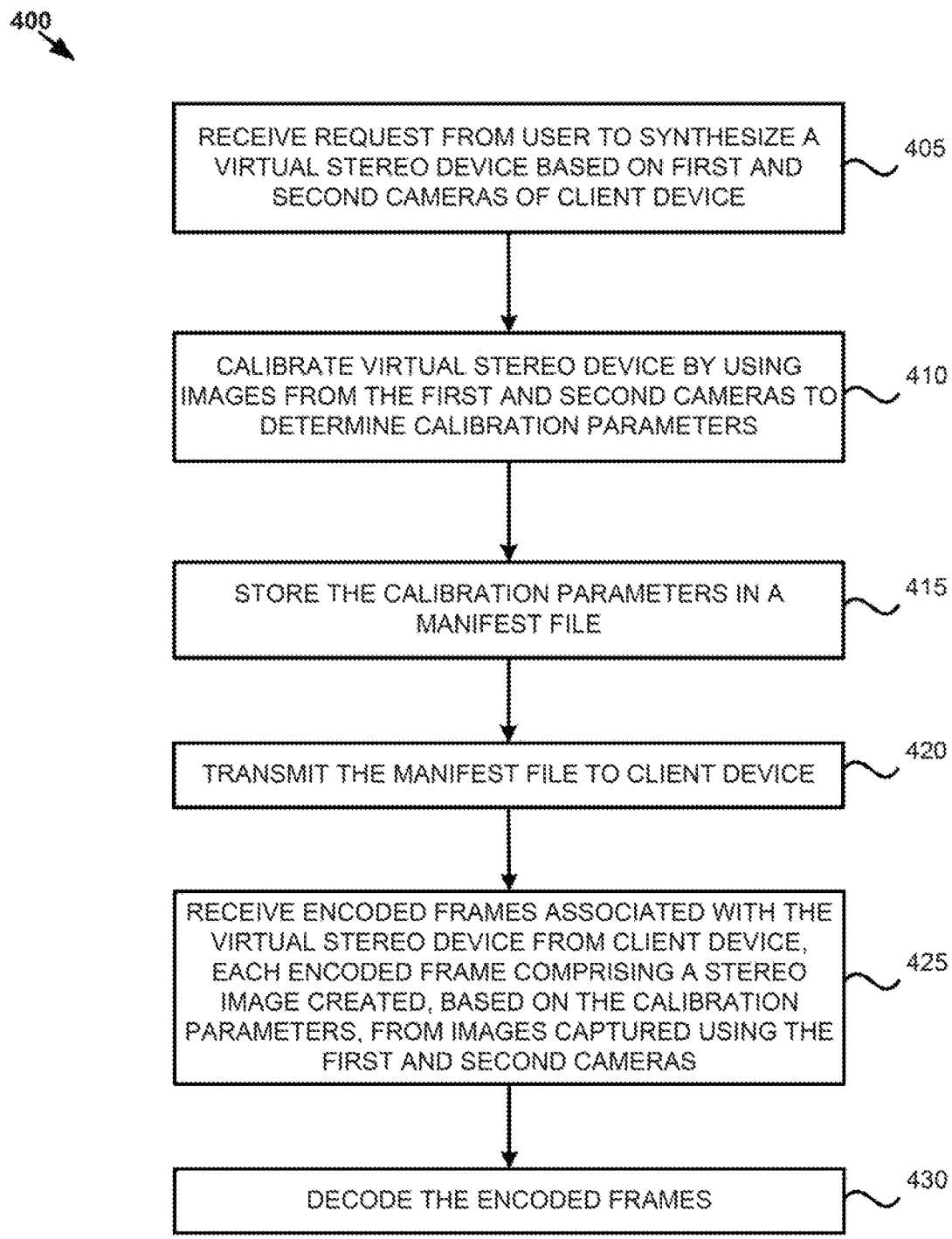
FIG. 4 illustrates example operations for synthesizing a virtual stereo device, according to embodiments of the present disclosure.

FIG. 4 illustrates example operations 400 related to synthesizing a virtual stereo device, according to embodiments of the present disclosure. Operations 400 may, for instance, be performed by virtual desktop agent 126 of FIGS. 1 and 2.

At 405, a request is received from a user to synthesize a virtual stereo device based on a first camera and a second camera associated with a client device. The request, for example, is received via a user interface associated with virtual desktop agent 126. In certain embodiments, validation is performed to ensure that the first and second cameras are compatible for use in synthesizing the virtual stereo device. For example, hardware capabilities such as resolution of the cameras may be determined and used to ensure compatibility. Cameras with significantly different resolutions, for example, may not be compatible for use in synthesizing the virtual stereo device.

At 410, the virtual stereo device is calibrated by using images from the first and second cameras to determine calibration parameters. In certain embodiments, virtual desktop agent 126 requests a series of images from the client device, and determines the calibration parameters based on the series of images.

At 415, the calibration parameters are stored in a manifest file. In some embodiments, connection-related information for the first and second cameras, such as descriptors of the first and second cameras, is also stored in the manifest file. The manifest file may, for example, comprise an eXtensible Markup Language (XML) file.

At 420, the manifest file is transmitted to the client device. The client device may, in some embodiments validate the manifest file based on information known to the client device about the first camera and second camera, such as descriptors and camera characteristics. It is noted that calibration is generally only necessary the first time the virtual stereo device is synthesized. Once the manifest file for the virtual stereo device has been generated and transmitted to the client device, steps 410, 415, and 420 may be omitted in future performances of operations 400, such as if the user disconnects the virtual stereo device and then subsequently reconnects the virtual stereo device.

At 425, encoded frames associated with the virtual stereo device are received from the client device, each encoded frame comprising a stereo image created, based on the calibration parameters in the manifest file, from images captured using the first and second cameras. For example, the client device may capture image pairs from the first and second camera and use the calibration parameters, filtering parameters, and specified stereo matching method to generate stereo images such as depth maps or disparity maps based on the requested virtual stereo device output image type. The stereo images may be encoded and transmitted to virtual desktop agent 126.

At 430, the encoded frames are decoded. Once decoded, the frames may be used to provide various types of functionality related to stereo vision. For example, if the frames comprise a depth map, the frames may be used to detect user input based on gestures and/or the frames may be displayed in a videoconferencing application. In another example, the frames comprise a two-dimensional point cloud projection, and the frames are used to display a two-dimensional representation of a three-dimensional environment, such as from a particular viewpoint (e.g., an object in the user's environment).

Figure 5:
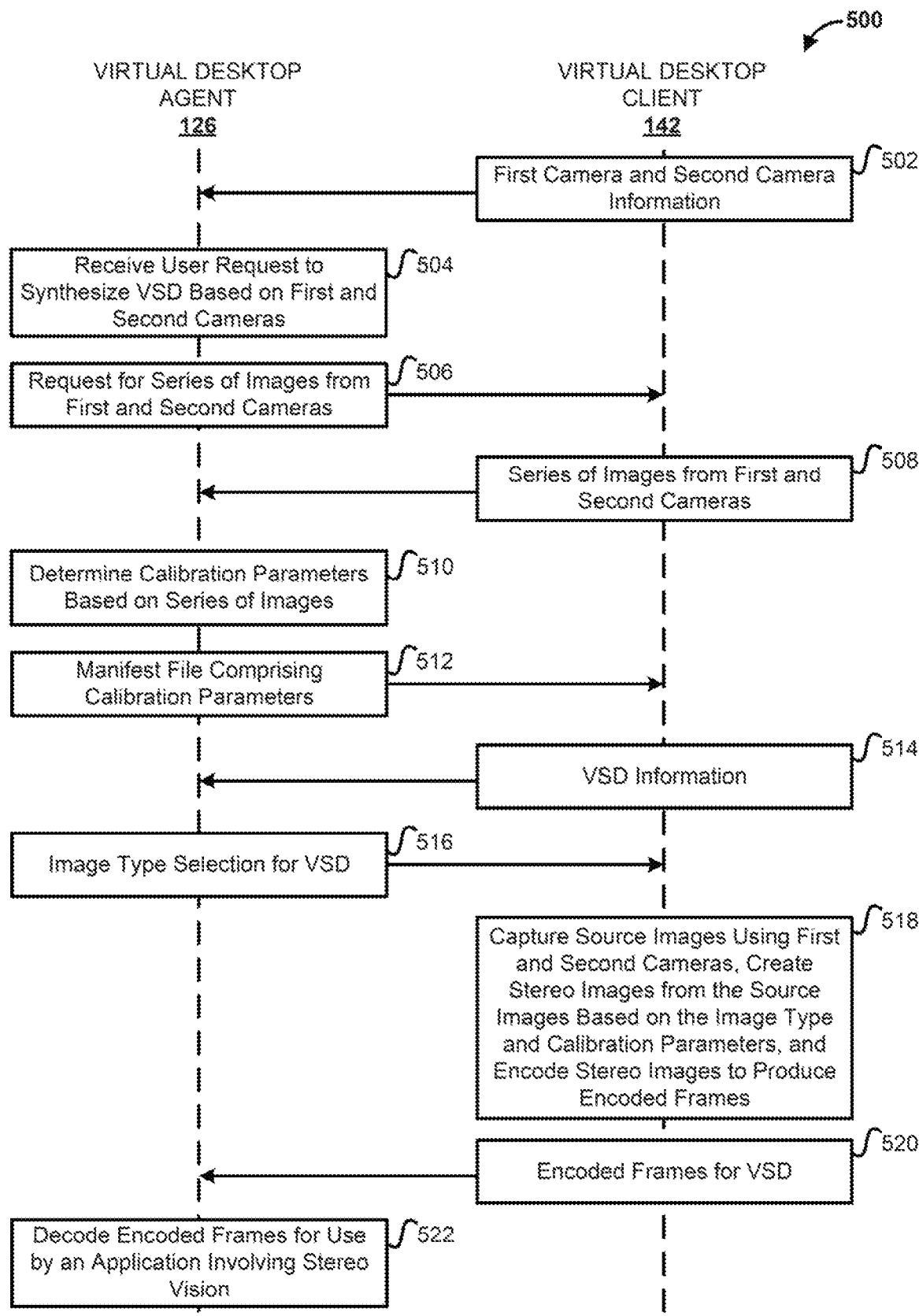
FIG. 5 illustrates an example exchange of messages between components related to synthesizing a virtual stereo device, according to embodiments of the present disclosure.

FIG. 5 illustrates an example 500 of messages exchanged between components related to synthesizing a virtual stereo device, according to embodiments of the present disclosure. Virtual desktop agent 126 and virtual desktop client 142 in example 500 may, for example, correspond to virtual desktop agent 126 and virtual desktop client 142 in FIGS. 1-3.

At 502, virtual desktop client 142 transmits information related to a first camera and a second camera to virtual desktop agent 126. For example, the information includes descriptors of the cameras that are provided to virtual desktop agent 126 through USB redirection or RTAV redirection.

At 504, virtual desktop agent 126 receives a user request to synthesize a virtual stereo device based on the first and second camera, such as through a user interface.

At 506, virtual desktop agent 126 transmits a request to virtual desktop client 142 for a series of images from the first and second cameras. For example, virtual desktop agent 126 may use the camera descriptors to request a particular series of frame pairs from different perspectives, orientations, positions, and/or the like from the first and second cameras.

At 508, virtual desktop client 142 transmits the series of images, as requested, to virtual desktop agent 126.

At 510, virtual desktop agent 126 determines calibration parameters based on the series of images.

At 512, virtual desktop agent 126 transmits a manifest file comprising the calibration parameters (and, in some embodiments, the camera descriptors), stereo matching method, and parameters for filtering to virtual desktop client 142.

At 514, virtual desktop client 142 transmits virtual stereo device (VSD) information to virtual desktop agent 126. For example, the VSD information may comprise an identifier or descriptor of the VSD.

At 516, virtual desktop agent 126 transmits an image type selection for the VSD to virtual desktop client 142. For example, a user may select an image type for the VSD through the user interface, and virtual desktop agent 126 may transmit the image type selection based on the user selection.

At 518, virtual desktop client 142 captures images from the first and second cameras, creates stereo images from the captured images based on the image type, calibration parameters, filtering parameters, and stereo-matching method, and encodes the stereo images to produce encoded frames.

At 520, virtual stereo client 142 transmits the encoded frames to virtual desktop agent 126 for the VSD, such as through RTAV redirection.

At 522, the encoded frames are decoded for use by an application involving stereo vision. For example, the frames may comprise depth maps, disparity maps, two-dimensional point cloud projections, or the like, and may be used in applications that provide functionality based on stereo images. Embodiments of the present disclosure may be useful in a vast number of contexts, as they provide accessible and efficient techniques for redirecting stereo images from a client device to a virtual desktop.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in a non-transitory computer-readable medium of the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for synthesizing a virtual stereo device, comprising:
   receiving, by a computing device, a request from a user to synthesize the virtual stereo device based on a first camera and a second camera, wherein the first camera and the second camera are associated with a client device;
   calibrating the virtual stereo device by using images received from the first camera and the second camera in order to determine calibration parameters by:
   receiving, from the client device, a series of images from the first camera and the second camera; and
   employing a calibration technique to determine the calibration parameters based on the series of images;
   storing the calibration parameters in a manifest file;
   transmitting the manifest file comprising the calibration parameters to the client device;
   receiving encoded frames associated with the virtual stereo device from the client device, wherein each of the encoded frames comprises a stereo image that has been created by the client device, based on the calibration parameters in the manifest file, from image data captured using the first camera and the second camera; and
   decoding the encoded frames for use by an application involving stereo vision.

2. The method of claim 1, wherein calibrating the virtual stereo device further comprises:
   transmitting a request to the client device for a series of images from the first camera and the second camera.

3. The method of claim 1, wherein the series of images comprises a plurality of frame pairs from the first camera and the second camera, and wherein the calibration technique involves determining camera characteristics of the first camera and the second camera based on the plurality of frame pairs.

4. The method of claim 3, wherein the calibration technique further involves determining, based on the plurality of frame pairs, one or more of: a coefficient matrix; and a rectification matrix.

5. The method of claim 1, further comprising: receiving, from the user, input that identifies an image type to be output by the virtual stereo device, wherein the encoded frames received from the client device correspond to the image type.

6. The method of claim 5, wherein the image type comprises one of:
   a depth map;
   a disparity map; or
   a two-dimensional point cloud projection.

7. The method of claim 6, wherein, when the image type is the two-dimensional point cloud projection, the client device generates the encoded frames by using a center of a line between the first camera and the second camera as an origin.

8. The method of claim 1, wherein the client device comprises a virtual desktop client, and wherein the computing device comprises a virtual desktop agent.

9. A non-transitory computer readable medium comprising instructions to be executed in a computer system, wherein the instructions when executed in the computer system perform a method for synthesizing a virtual stereo device, the method comprising:
   receiving, by a computing device, a request from a user to synthesize the virtual stereo device based on a first camera and a second camera, wherein the first camera and the second camera are associated with a client device;
   calibrating the virtual stereo device by using images received from the first camera and the second camera in order to determine calibration parameters by:
   receiving, from the client device, a series of images from the first camera and the second camera; and
   employing a calibration technique to determine the calibration parameters based on the series of images;
   storing the calibration parameters in a manifest file;
   transmitting the manifest file comprising the calibration parameters to the client device;
   receiving encoded frames associated with the virtual stereo device from the client device, wherein each of the encoded frames comprises a stereo image that has been created by the client device, based on the calibration parameters in the manifest file, from image data captured using the first camera and the second camera; and
   decoding the encoded frames for use by an application involving stereo vision.

10. The non-transitory computer readable medium of claim 9, wherein calibrating the virtual stereo device further comprises:
    transmitting a request to the client device for a series of images from the first camera and the second camera.

11. The non-transitory computer readable medium of claim 9, wherein the series of images comprises a plurality of frame pairs from the first camera and the second camera, and wherein the calibration technique involves determining camera characteristics of the first camera and the second camera based on the plurality of frame pairs.

12. The non-transitory computer readable medium of claim 11, wherein the calibration technique further involves determining, based on the plurality of frame pairs, one or more of: a coefficient matrix; and a rectification matrix.

13. The non-transitory computer readable medium of claim 9, wherein the method further comprises: receiving, from the user, input that identifies an image type to be output by the virtual stereo device, wherein the encoded frames received from the client device correspond to the image type.

14. The non-transitory computer readable medium of claim 13, wherein the image type comprises one of:
   a depth map;
   a disparity map; or
   a two-dimensional point cloud projection.

15. The non-transitory computer readable medium of claim 14, wherein, when the image type is the two-dimensional point cloud projection, the client device generates the encoded frames by using a center of a line between the first camera and the second camera as an origin.

16. The non-transitory computer readable medium of claim 9, wherein the client device comprises a virtual desktop client, and wherein the computing device comprises a virtual desktop agent.

17. A computer system, wherein system software for the computer system is programmed to execute a method for synthesizing a virtual stereo device, the method comprising:
   receiving, by a computing device, a request from a user to synthesize the virtual stereo device based on a first camera and a second camera, wherein the first camera and the second camera are associated with a client device;
   calibrating the virtual stereo device by using images received from the first camera and the second camera in order to determine calibration parameters by:
   receiving, from the client device, a series of images from the first camera and the second camera; and
   employing a calibration technique to determine the calibration parameters based on the series of images;
   storing the calibration parameters in a manifest file;
   transmitting the manifest file comprising the calibration parameters to the client device;
   receiving encoded frames associated with the virtual stereo device from the client device, wherein each of the encoded frames comprises a stereo image that has been created by the client device, based on the calibration parameters in the manifest file, from image data captured using the first camera and the second camera; and
   decoding the encoded frames for use by an application involving stereo vision.

18. The computer system of claim 17, wherein calibrating the virtual stereo device further comprises:
   transmitting a request to the client device for a series of images from the first camera and the second camera.

19. The computer system of claim 17, wherein the series of images comprises a plurality of frame pairs from the first camera and the second camera, and wherein the calibration technique involves determining camera characteristics of the first camera and the second camera based on the plurality of frame pairs.

20. The computer system of claim 19, wherein the calibration technique further involves determining, based on the plurality of frame pairs, one or more of: a coefficient matrix; and a rectification matrix.

* * * * *